(12) United States Patent
Defontaine et al.

(10) Patent No.: US 12,270,789 B2
(45) Date of Patent: Apr. 8, 2025

(54) TUBULAR SLEEVE FOR MEASURING THE VISCOELASTICITY OF A PRODUCT TO BE ANALYSED

(71) Applicant: RHEAWAVE, Tours (FR)

(72) Inventors: Marielle Defontaine, Tours (FR); Hélène Lebertre, Tours (FR)

(73) Assignee: RHEAWAVE, Tours (FR)

( * ) Notice: Subject to any disclaimer, the term of this patent is extended or adjusted under 35 U.S.C. 154(b) by 311 days.

(21) Appl. No.: 18/004,775

(22) PCT Filed: Jun. 30, 2021

(86) PCT No.: PCT/EP2021/068086
§ 371 (c)(1),
(2) Date: Jan. 9, 2023

(87) PCT Pub. No.: WO2022/008326
PCT Pub. Date: Jan. 13, 2022

(65) Prior Publication Data
US 2023/0258607 A1 Aug. 17, 2023

(30) Foreign Application Priority Data

Jul. 10, 2020 (FR) ........................ 2007317

(51) Int. Cl.
*G01N 29/22* (2006.01)
*G01N 29/34* (2006.01)

(52) U.S. Cl.
CPC ......... *G01N 29/222* (2013.01); *G01N 29/223* (2013.01); *G01N 29/348* (2013.01);
(Continued)

(58) Field of Classification Search
CPC .. G01N 29/222; G01N 29/223; G01N 29/348; G01N 29/024; G01N 29/032;
(Continued)

(56) References Cited

U.S. PATENT DOCUMENTS 3,842,932 A * 10/1974 Gibel ................. F01N 13/1844
181/258
7,102,562 B2 * 9/2006 Moller ............... G01R 29/0821
342/173
2003/0051558 A1 3/2003 Melnikov et al.

FOREIGN PATENT DOCUMENTS

EP 0118840 A2 9/1984
EP 2294401 3/2011
(Continued)

OTHER PUBLICATIONS

International Search Report dated Sep. 23, 2021 for corresponding International Application No. PCT/EP2021/068086, filed Jun. 30, 2021.
(Continued)

*Primary Examiner* — Suman K Nath
(74) *Attorney, Agent, or Firm* — David D. Brush; Westman, Champlin & Koehler, P.A.

(57) ABSTRACT

An acoustic device for localized and contactless measurement of viscoelasticity of a product to be analyzed. The device includes a generator of high-frequency ultrasonic pulses; an ultrasonic receiver for receiving the high-frequency ultrasonic pulses; the generator and the receiver being disposed relative to each other such that the high-frequency ultrasonic pulses propagate within the sample to be analyzed. The generator and the receiver are mounted on a tubular connecting sleeve intended to connect together two portions of a pipe in which the product to be analysed is intended to move from one portion to another. The tubular sleeve includes a first mounting zone for the generator and a second mounting zone for the receiver. The tubular sleeve is non-anechoic in the first and second mounting zones and, according to a circumferential distribution, anechoic between the first and second mounting zones.

11 Claims, 4 Drawing Sheets

(52) U.S. Cl.
CPC . *G01N 2291/022* (2013.01); *G01N 2291/028* (2013.01); *G01N 2291/102* (2013.01)

(58) Field of Classification Search
CPC ....... G01N 2291/022; G01N 2291/028; G01N 2291/102; G01N 2291/02818; G01N 2291/02827
See application file for complete search history.

(56) References Cited

FOREIGN PATENT DOCUMENTS

| WO | WO-2008013957 A1 * | 1/2008 | ............. G01F 1/662 |
| WO | 2010007234 A1 | 1/2010 | |

OTHER PUBLICATIONS

Written Opinion of the International Searching Authority dated Sep. 23, 2021 for corresponding International Application No. PCT/EP2021/068086, filed Jun. 30, 2021.

English translation of the Written Opinion of the International Searching Authority dated Sep. 23, 2021 for corresponding International Application No. PCT/EP2021/068086, filed Jun. 30, 2021.

* cited by examiner

TUBULAR SLEEVE FOR MEASURING THE VISCOELASTICITY OF A PRODUCT TO BE ANALYSED

CROSS-REFERENCE TO RELATED APPLICATIONS

This Application is a Section 371 National Stage Application of International Application No. PCT/EP2021/068086, filed Jun. 30, 2021, the content of which is incorporated herein by reference in its entirety, and published as WO 2022/008326 on Jan. 13, 2022, not in English.

FIELD OF THE DISCLOSURE

The field of the invention is that of the design and manufacture of acoustic devices for measuring the viscoelastic properties of a fluid product and in particular, yet not exclusively, in the food or cosmetics fields.

More specifically, the invention relates to an acoustic device for localised and contactless measurement of the viscoelasticity of a product and, possibly, of the elastic and dissipative nonlinearities.

BACKGROUND OF THE DISCLOSURE

The patent document published under the number US 2003/051558 A1 is known, which describes a device for measuring the volume flow rates of components in liquid and gaseous phases, and for determining their volume concentration in a multi-phase mixture along a pipe. The patent document published under the number EP 0 118 840 A2 is also known, which describes a device for calculating the concentrations of at least two gaseous constituents such as hydrogen and water vapour in a gaseous mixture.

In the field of the invention, the acoustic device described in the patent document published under the number EP 2 294 401 is known, designed for localised and contactless measurement of the elastic and dissipative nonlinearities and of the viscoelasticity of a sample. The described acoustic device comprises:
- a tank filled with a fluid, intended to receive the sample to be analysed;
- means for emitting a low-frequency acoustic wave, able to create a periodic low-frequency variation in the hydrostatic pressure in the region of the sample;
- measuring means able to measure the variations in the hydrostatic pressure of a low-frequency acoustic wave generated by the emission means;
- means for generating high-frequency ultrasonic pulses;
- reception means disposed opposite the generation means, to receive the high-frequency ultrasonic pulses having passed through the sample;
- synchronisation equipment allowing generating a synchronisation signal to synchronise the measurements of the high-frequency pulses and of the low-frequency pressure;
- an analysis unit comprising a module for calculating the elastic and dissipative nonlinearities as well as the viscoelasticity of the sample based on the modulations of the time of flight and of the amplitude of the ultrasonic pulses having passed through the sample as a function of the pressure variations due to the low-frequency acoustic wave.

Such a device has the advantage of enabling the measurement of the elastic and dissipative nonlinearities and of the viscoelasticity in fields of application where contact with the measuring system is undesirable, such as the food industry, cosmetics and biomedical applications.

However, this solution of the prior art is applicable only to samples picked up from a production line and therefore does not enable the continuous analysis of the product during production.

To overcome this drawback of the prior art, a mechanical-acoustic solution has been proposed in practice consisting of a mechanical support with a circular shape on one or two tray(s) (each forming a crown), on which ultrasonic transducers are fastened, most of the time opposite each other. Such a crown is designed so as to open in two and clip directly on a pipe of a production line.

Hence, this solution enables the continuous and real-time analysis of a product during production.

Nonetheless, it has been noticed that the implementation of this solution generates some technical difficulties which lead in particular to inaccuracies in the obtained results.

One of the encountered difficulties lies in the transmission of the ultrasonic signals, which have very low amplitude levels, and whose reception may be interfered with by echoes that might have propagated across the thickness of the pipe.

Indeed, the acoustic impedances of the front faces of the ultrasonic transducers being most of the time closer to the acoustic impedance of the pipes of the production lines (generally made of stainless steel) than those of the product subjected to the viscoelasticity measurement, a non-negligible portion of the ultrasonic energy propagates across the thickness of the wall of the pipes.

This phenomenon limits the amount of energy propagating in the analysed is product. This results in a difficult analysis of the received ultrasonic signals (that being so because of the multiplicity of echoes, sometimes with overlapping or superposition) and a strong attenuation of the echoes of interest, i.e. those having passed through the product to be analysed.

Another difficulty of the crown solution lies in its integration on the production installation, which might lead to significant variabilities in terms of sensitivity, or pose problems of space, in spaces that are confined and therefore not easily accessible for an installer.

SUMMARY

In particular, an objective of the invention is to overcome these drawbacks of the prior art.

More specifically, an objective of the invention is to propose an acoustic device for localised and contactless measurement of the viscoelasticity of a product to be analysed which suppresses, or at the very least significantly limits, the effect of parasitic echoes across the thickness of the pipe in which the product to be analysed circulates and throughout which ultrasonic signals are emitted and received.

Another objective of the invention is to provide such an acoustic device which can be installed easily and quickly on a pipe in which the product to be analysed passes.

In this respect, another objective of the invention is to provide such an acoustic device which is compact.

These objectives, as well as others which will appear later on, are achieved thanks to the invention which relates to an acoustic device for localised and contactless measurement of the viscoelasticity of a product to be analysed, of the type comprising:
- means for generating high-frequency ultrasonic pulses;

means for receiving high-frequency ultrasonic pulses generated by the generation means; the generation means and the reception means being disposed relative to each other such that the high-frequency ultrasonic pulses propagate within the sample to be analysed;

characterised in that it comprises a tubular connecting sleeve intended to connect together two portions of a pipe in which the product to be analysed is intended to move from one portion to another, the generation means and the reception means being mounted on the tubular sleeve, the tubular sleeve comprising a first mounting zone for the generation means and a second mounting zone for the reception means, the tubular sleeve being non-anechoic in the first and second mounting zones and, according to a circumferential distribution, anechoic between the first and second mounting zones.

Thus, thanks to the invention, the propagation of the ultrasonic signals is favoured throughout the pipe, and therefore throughout the product to be analysed itself, that being so to the detriment of the ultrasonic propagation across the thickness of the wall of the pipe itself.

In other words, in contrast with the prior art, the ultrasonic energy that propagates across the thickness of the wall of the pipe is absorbed or dissipated almost entirely and therefore does not reach the reception means. Thus, the reception means essentially receive only, or almost only, the energy propagating in the product to be analysed This results in an acquisition, and therefore an analysis, of the received ultrasonic signals that is more reliable, these being less subject to interference by the echoes generated by the propagation of ultrasonic energy throughout the wall of the pipe.

The suppression, or at the very least the limitation, of the parasitic effects of the ultrasonic signals propagating throughout the wall of the pipe is obtained by the implementation of anechoic zones between the first mounting zone and the second mounting zone, which allows rapidly absorbing the amplitude of the wave as it propagates, in particular over a short distance. This acoustic attenuation might result from several physical phenomena such as absorption, diffusion, diffraction or localised resonance phenomena that trap the ultrasonic energy spatially and often in frequency bands related to the characteristics of the diffusing network.

Hence, the principle of the invention consists in designing the tubular sleeve with two structurally distinct zones, namely:
  the non-anechoic zones, macroscopically homogeneous (with regards to the ultrasonic wavelengths), tending to favour the propagation of the ultrasound towards the inside of the pipe (and not within the wall of the pipe), i.e. by crossing the pipe according to the shortest propagation path; this zone is therefore acoustically non-absorbent;
  the other zone, the attenuating one, is therefore anechoic, so that the ultrasonic energy sent in this zone is dissipated, annihilating any parasitic echo of propagation in the wall of the tubular sleeve.

The selection of the material(s) forming the sleeve is partly guided by the constraints encountered in the sector of application of the sleeve according to the invention, these constraints possibly being related to resistance to the applied flow rate and/or to industrial cleaning. Thus, frequently, the retained solution will be of the stainless steel type, any other material from the family of plastic polymers and elastomers, and possibly any other composite material, that may be considered.

According to a first embodiment, the tubular sleeve extends between two ends according to an axis of movement of the product to be analysed, the generation means and the reception means being mounted opposite one another perpendicular to the axis of movement.

According to a second possible embodiment, the tubular sleeve extends between two ends according to an axis of movement of the product to be analysed, the generation means and the reception means being mounted on the tubular sleeve in a diametrically opposite manner, the generation means being disposed according to a generation axis and the reception means being disposed according to a reception axis, the generation axis and the reception axis being essentially parallel to each other.

For some products, such arrangements allow promoting the propagation of the ultrasonic signals throughout the product rather than the wall of the tubular sleeve.

According to an advantageous solution, the tubular sleeve has a first flat surface in the first mounting zone, on which the generation means are mounted, and a second flat surface in the second mounting zone, on which the reception means are mounted.

Such flat surfaces facilitate mounting of the ultrasonic transducers on the corresponding mounting zones, by forming reception zones on which it is easy to attach the components.

According to another advantageous feature, the tubular sleeves have a first cavity in the first mounting zone, in which the generation means are mounted, and a second cavity in the second mounting zone, in which the reception means are mounted.

Such cavities form some kind of gutters in which the ultrasonic transducers are housed, which might contribute to substantially reduce the size of the tubular sleeve.

According to a first particular embodiment, the tubular sleeve has a body delimiting an inner recess for the circulation of the product to be analysed between the two pipe portions, the body being integral with the first and second mounting zones.

In this case, the body preferably has a narrowing in thickness between the first and second mounting zones.

In this manner, the narrowing of the inner wall provides the advantages of:
  limiting as much as possible the amount of non-anechoic material between the first and second mounting zones, which are likely to enable a propagation, even reduced, of the ultrasonic signals from the first mounting zone to the second mounting zone;
  providing a volume that is even larger as the narrowing is marked, to dispose the anechoic zone between the first and second mounting zone.

According to an advantageous solution of this embodiment, the tubular sleeve comprises at least two distinct materials, including a non-anechoic material for the first and second mounting zones and for the body, and an anechoic material for circumferential filling between the first and second mounting zones.

Preferably, the anechoic material is selected from the following group:
  an alveolar material;
  a stratified material whose strata form a gradient of acoustic impedances;
  a granular material.

Of course, other materials may be considered without departing from the scope of the invention, the retained material being selected for its rigidity and its mechanical strength, while ensuring good ultrasonic attenuation, by multiple diffusion, leading to the extinction, or almost, of the received energy.

According to a second possible embodiment, the tubular sleeve is made of the same material in the first and second mounting zones and between the first and second mounting zones, the material being shaped with a plurality of anechoic reliefs and/or patterns between the first and second mounting zones.

In other words, the anechoic nature of the material between the first and second mounting zones is obtained by structural shaping, which can be obtained by machining or moulding.

Independently of the embodiment, the acoustic device according to the invention advantageously has an assembly collar at each of its ends.

Such a feature facilitates mounting of the tubular sleeve between two pipe portions to be connected by the sleeve, each of the two portions having at its free end an assembly collar complementary to that of the tubular sleeve.

BRIEF DESCRIPTION OF THE DRAWINGS

Other features and advantages of the invention will appear more clearly upon reading the following description of several embodiments of the invention, provided as illustrative and non-limiting examples and from the appended drawings, wherein.

DETAILED DESCRIPTION OF ILLUSTRATIVE EMBODIMENTS

As indicated before, the invention relates to an acoustic device for localised and contactless measurement of the viscoelasticity of a product to be analysed, and is of the type comprising:
means 1 for generating high-frequency ultrasonic pulses;
means 2 for receiving high-frequency ultrasonic pulses generated by the generation means 1.

Figure 1:
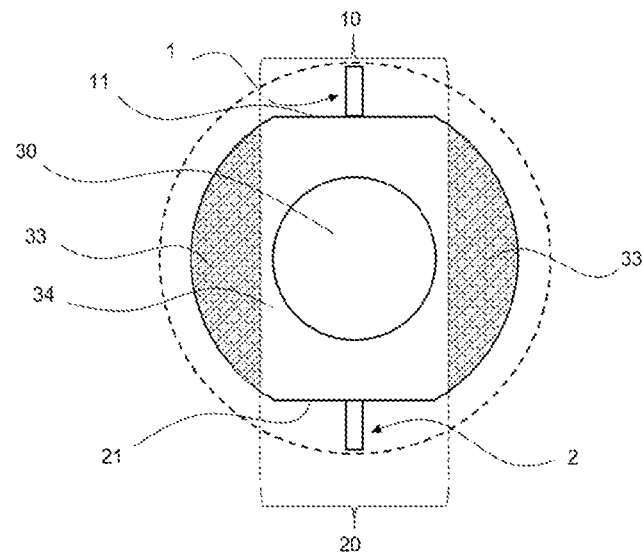
FIGS. 1 and 2 schematically illustrate an acoustic measuring device according to a first embodiment of the invention, viewed respectively from the end and from the side.
Figure 2:
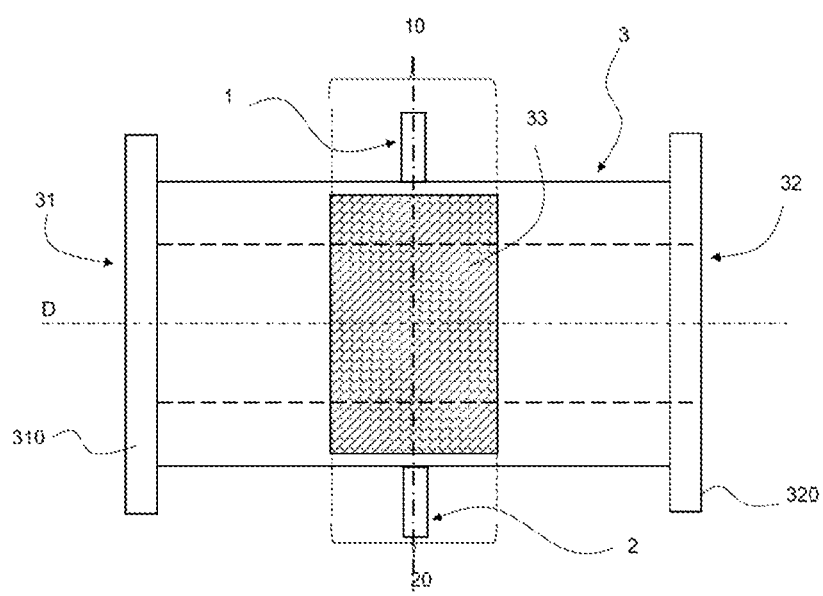

As illustrated by FIGS. 1 and 2, the generation means 1 and the reception means 2 are, according to the principle of the invention, mounted on a tubular sleeve 3, having a central recess 30, this tubular connecting sleeve being intended to connect together two portions of a pipe (not represented) in which the product to be analysed is intended to move from one portion to another, throughout the central recess 30 of the tubular connecting sleeve.

Preferably, the high-frequency ultrasonic pulses have the following characteristics:
frequency range: 50 kHz to 50 MHz;
ultrasonic pulse type: longitudinal (or compression), transverse (or shear) and torsion wave;
modalities: pulse wave, continuous or transient wave train;
emitter and receiver: any type of ultrasonic pulse generator may be considered.

As shown in FIG. 1, the generation means 1 and the reception means 2 are disposed with respect to each other such that the high-frequency ultrasonic pulses propagate within the analysed sample which passes through the central recess 30 of the tubular connecting sleeve.

Such an acoustic device for measuring the viscoelasticity of a product to be analysed is intended to be associated with means for calculating and analysing the viscoelasticity based on the high-frequency ultrasonic pulses captured by the reception means.

In addition, such an acoustic device is advantageously coupled to means for emitting a low-frequency acoustic wave able to create a low-frequency periodic variation in the hydrostatic pressure of the product to be analysed, and measuring means able to measure the variations in the hydrostatic pressure due to the low-frequency acoustic wave. The fact of generating a variation in the hydrostatic pressure in the product to be analysed using the low-frequency acoustic wave interacting in a synchronised manner, in the product to be analysed, with an ultrasonic wave allows obtaining an instantaneous measurement of the viscoelastic effects and of the nonlinear elastic and dissipative effects in the analysed product.

The use of a low-frequency acoustic wave to generate the variations in the hydrostatic pressure in the medium allows studying the dynamics of the nonlinear acoustic effects during the successive phases of expansion and compression of the sample.

The processing of the high-frequency ultrasonic pulses received by the reception means is described by the means and by an algorithm, such as those disclosed in the patent document published under the number EP 2 294 401, without these means and algorithm being exclusive of others processing techniques.

According to the principle of the invention, the generation means 1 are mounted in a first mounting zone 10 of the tubular connecting sleeve and the reception means 2 are mounted in a second mounting zone 20 of the tubular connecting sleeve.

Furthermore, the tubular sleeve is non-anechoic in the first and second mounting zones 10, 20 whereas, according to a circumferential distribution, the tubular sleeve is anechoic between the first and second mounting zones 10, 20, i.e. in the anechoic zones 33 shown in FIGS. 1 and 2.

Figure 4:
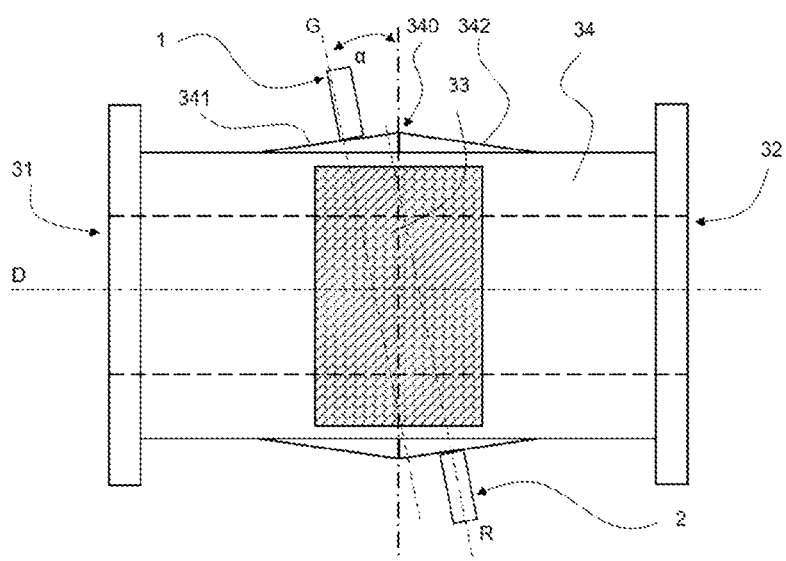
Figure 7:
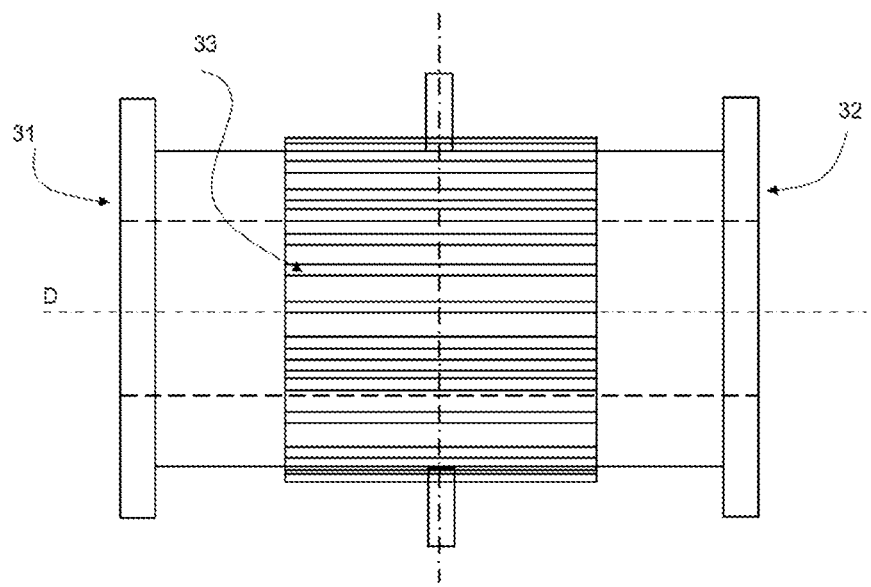

Referring to FIGS. 2, 4 and 7, the tubular connecting sleeve extends axially between two ends 31, 32 defining therebetween an axis of movement D of the product to be analysed, the central recess 30 of the sleeve extending open-through from one end to another.

Each end 31, 32 has an assembly collar 310, 320, intended to enable the assembly of the tubular connecting sleeve each with a portion of a pipe in which the product to be analysed is intended to move from one portion to the another. The collars 310, 320 have suitable means, and in particular a plurality of bores, to enable the connection of the sleeve with the pipe portions, for example by screwing/bolting.

According to the embodiment illustrated by FIGS. 1 and 2, the tubular sleeve is cylindrical between the collars 310 and 320, the recess 30 being cylindrical too, that being so with the axis of movement D as the central axis.

In this configuration, the generation means 1 and the reception means 2 are mounted opposite each other, in a diametrically opposite manner, i.e. perpendicular to the axis of movement D.

According to another feature of this embodiment illustrated by FIG. 1, the tubular sleeve has a first flat surface 11 in the first mounting zone 10, the generation means 1 being mounted on this flat surface 11. In addition, the tubular sleeve has a second flat surface 21 in the second mounting zone 20, the reception means 2 being mounted on this second flat surface 21.

As shown in FIG. 2, the anechoic zone of the tubular sleeve extends longitudinally according to the axis of movement D in the same portion of the sleeve as the mounting zones.

In this longitudinal portion, and as illustrated by FIG. 1, the anechoic zones 30 are diametrically opposed and each has the shape of a portion of a cylinder so as to circumferentially surround the first and second mounting zones.

For this purpose, the tubular sleeve has a body 34 delimiting the central recess 30 intended to enable the circulation of the product to be analysed between the two pipe portions to which the sleeve is intended to be connected. This body 34 is integral with the first mounting zone and the second mounting zone, made of a non-anechoic material. In addition, the body 34 has, along the length of the mounting zones according to the axis of movement D, a narrowing (340) in thickness between the first and second mounting zones.

In this configuration, the tubular sleeve is formed by two distinct materials, including a non-anechoic material for the first and second mounting zones as well as for the body 34, and an anechoic material for circumferential filling between the first and second mounting zones, i.e. in the anechoic zones 33 illustrated in FIG. 1.

Joining of the two materials, non-anechoic and anechoic, is carried out by any suitable technique. In this respect, the two materials may be screwed together or chemically bonded.

Preferably, the anechoic material is a material approved by the hygiene and safety standards of the food industry, such as stainless steels or some polymers or composites. It is also possible to use other materials such as glass.

In turn, the anechoic material is selected from the following groups:
an alveolar material;
a stratified material whose strata form a gradient of acoustic impedances;
a granular material.

More specifically, the anechoic material may be selected from among the following materials:
a solid foam;
a metallic trabecular architecture;
an aggregate or elastomer beads;
sand;
a natural or synthetic rubber, filled (microbeads, powder, beads . . . ), structured (foams) or composites;
a material obtained by 3D printing (plastic, metals, various alloys, glass, ceramics . . . )

Different variants of an acoustic device for localised and contactless measurement of the viscoelasticity of a product to be analysed are described hereinafter.

Figure 3:
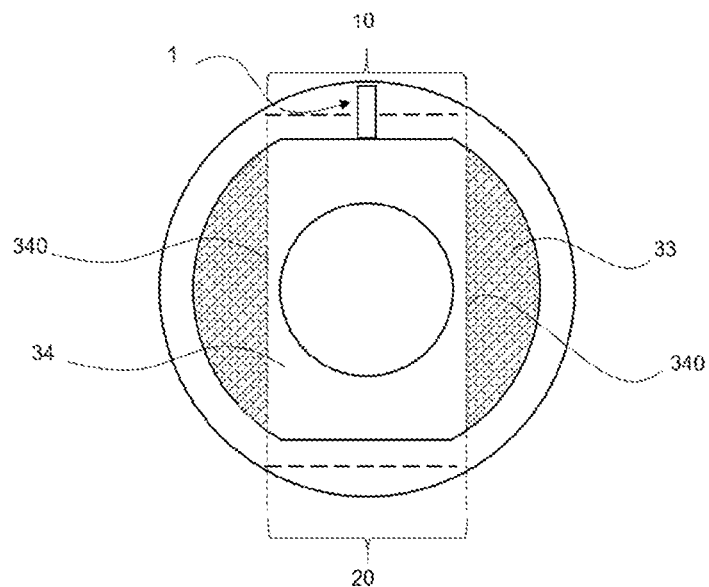
FIGS. 3 and 4 schematically illustrate an acoustic measuring device according to a second embodiment of the invention, viewed respectively from the end and from the side.

According to the embodiment illustrated by FIGS. 3 and 4, the general structure and the distribution of the anechoic and non-anechoic zones of the tubular connecting sleeve are retained with regards to the previously-described embodiment. The provided variant relates to the arrangement of the means for generating and the means for receiving the high-frequency ultrasonic pulses.

As shown in FIG. 4, the generation means and the reception means are mounted in a diametrically opposite manner on the tubular sleeve 3. The generation means 1 are disposed according to a generation axis G, whereas the reception means 2 are disposed according to a reception axis R, with the generation axis G and the reception axis R parallel to each other (or essentially parallel to each other).

In addition, the generation axis G and the reception axis R are inclined by an angle $\alpha$ with respect to the perpendicular to the axis of movement D. For indication, this angle $\alpha$ can vary between 10° and 80°.

To do so, the body 34 has, in the space of the first and second mounting zones according to the axis of movement D, an excrescence 340 formed by two inclined sidewalls 341, 342 with opposite slopes but with the same angle with respect to the axis of movement D. The generation means 1 are carried by the inclined sidewall 341 and, diametrically opposed, the reception means are carried by the inclined sidewall 342.

Figure 4B:
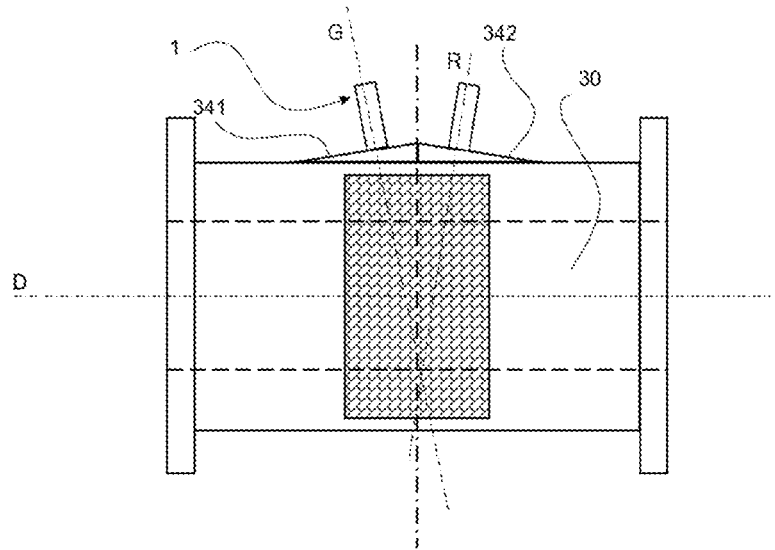
FIG. 4b schematically illustrates an acoustic measuring device according to a variant of the second embodiment of the invention FIG. 5 schematically illustrates an acoustic measuring device according to a variant of the invention, viewed from the end.

FIG. 4b illustrates a variant of the second embodiment which has just been described with reference to FIGS. 3 and 4. As shown in FIG. 4b, the generation means 1 are carried by the inclined sidewall 341 and the reception means are carried by the inclined sidewall 342, on the same side of the sleeve or, in other words, in the vicinity of each other. In this case, the generation means 1 are disposed according to a generation axis G, whereas the reception means 2 are disposed according to a reception axis R, with the generation axis G and the reception axis R inclined so as to converge, when viewed in cross-section from the side as illustrated by FIG. 4b, within the recess 30 of the sleeve.

Figure 5:
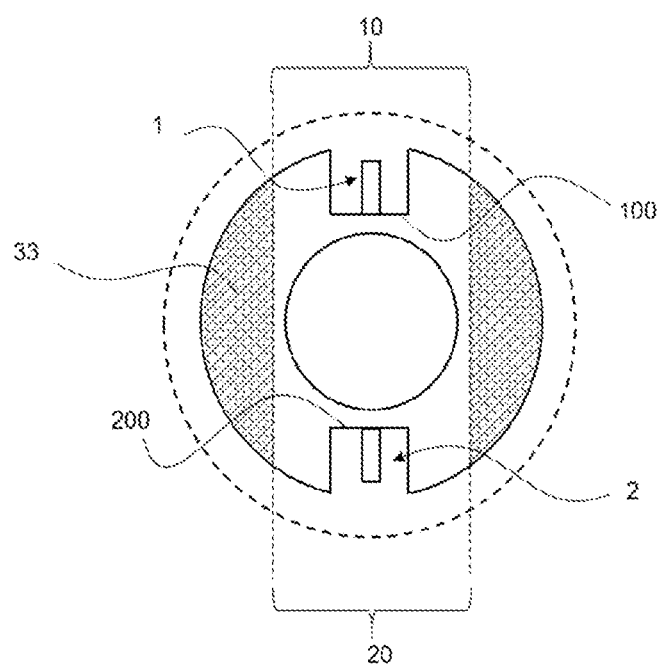

FIG. 5 describes another variant of a tubular sleeve according to the invention, which differs from the previously-described first embodiment in that the tubular sleeve has a first cavity 100 in the first mounting zone 10, the generation means 1 being mounted inside this cavity 100. The tubular sleeve further has a second cavity 200 in the second mounting zone 20, diametrically opposite with respect to the first cavity 100, the reception means 2 being mounted inside this second cavity.

Figure 6:
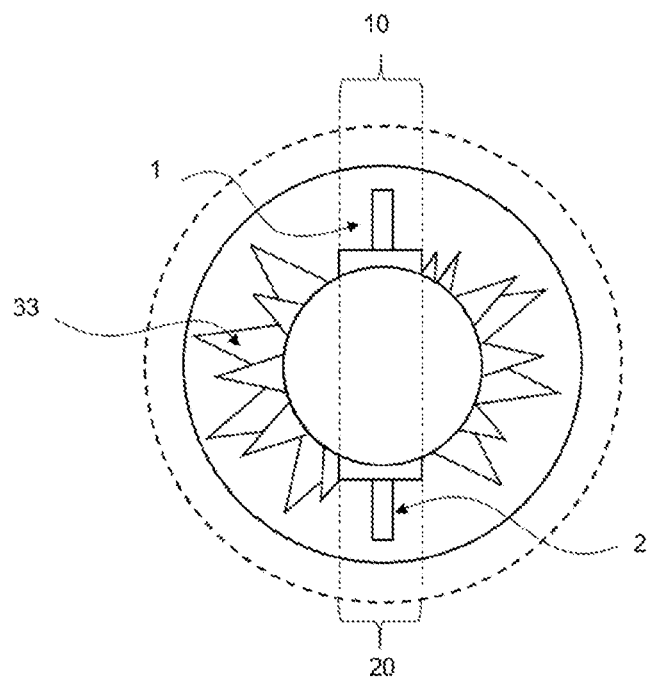
FIGS. 6 and 7 schematically illustrate an acoustic measuring device according to a third embodiment of the invention, viewed respectively from the end and from the side.

FIGS. 6 and 7 illustrate yet another embodiment of a tubular sleeve of an acoustic device according to the invention which differs from the previously-described first embodiment in that the anechoic and non-anechoic zones of the tubular sleeve are made of the same material. In other words, the tubular sleeve is made of the same material in the first and second mounting zones 10, 20 and between the first and second mounting zones, i.e. in the anechoic zones 33.

In this case, the material of the tubular sleeve is shaped, for example by surface machining according to a predetermined absorption pattern, so as to feature a plurality of anechoic reliefs or patterns between the first and second mounting zones according to a circumferential distribution. In addition, these anechoic reliefs and/or patterns can be repeated on either side of the mounting zones 10, 20 according to the axis of movement D.

Although the present disclosure has been described with reference to one or more examples, workers skilled in the art will recognize that changes may be made in is form and detail without departing from the scope of the disclosure and/or the appended claims.

The invention claimed is:

1. An acoustic device for localised and contactless measurement of viscoelasticity of a product to be analysed, the acoustic device comprising:

an ultrasonic pulse generator for generating high-frequency ultrasonic pulses;

an ultrasonic receiver for receiving high-frequency ultrasonic pulses generated by the ultrasonic pulse generator; the ultrasonic pulse generator and the ultrasonic receiver being disposed relative to each other such that the high-frequency ultrasonic pulses propagate within the sample to be analysed; and a tubular connecting sleeve configured to connect together two portions of a pipe in which the product to be analysed is intended to move from one portion to another, the ultrasonic pulse generator and the ultrasonic receiver being mounted on the tubular sleeve, the tubular sleeve comprising a first mounting zone for the ultrasonic pulse generator and a second mounting zone for the ultrasonic receiver, the tubular sleeve being non-anechoic in the first and second mounting zones and, according to a circumferential distribution, anechoic between the first and second mounting zones.

2. The acoustic device according to claim 1, wherein the tubular sleeve extends between two ends according to an axis of movement of the product to be analysed, the ultrasonic pulse generator and the ultrasonic receiver being mounted opposite one another perpendicular to the axis of movement.

3. The acoustic device according to claim 1, wherein the tubular sleeve extends between two ends according to an axis of movement of the product to be analysed, the ultrasonic pulse generator and the ultrasonic receiver being mounted on the tubular sleeve in a diametrically opposite manner, the ultrasonic pulse generator being disposed according to a generation axis and the ultrasonic receiver being disposed according to a reception axis, the generation axis and the reception axis being essentially parallel to each other.

4. The acoustic device according to claim 1, wherein the tubular sleeve has a first flat surface in the first mounting zone, on which the ultrasonic pulse generator is mounted, and a second flat surface in the second mounting zone, on which the ultrasonic receiver is mounted.

5. The acoustic device according to claim 1, wherein the tubular sleeve has a first cavity in the first mounting zone, in which the are ultrasonic pulse generator is mounted, and a second cavity in the second mounting zone, in which the ultrasonic receiver is mounted.

6. The acoustic device according to claim 1, wherein the tubular sleeve has a body delimiting a central recess for circulation of the product to be analysed between the two pipe portions, the body being integral with the first and second mounting zones.

7. The acoustic device according to claim 6, wherein the body has a narrowing in thickness between the first and second mounting zones.

8. The acoustic device according to claim 6, wherein the tubular sleeve comprises at least two distinct materials, including a non-anechoic material for the first and second mounting zones and for the body, and an anechoic material circumferential filling between the first and second mounting zones.

9. The acoustic device according to claim 8, wherein the anechoic material is selected from the group consisting of:
an alveolar material;
a stratified material whose strata form a gradient of acoustic impedances;
a granular material.

10. The acoustic device according to claim 1, wherein the tubular sleeve is made of a same material in the first and second mounting zones and between the first and second mounting zones, the material being shaped with a plurality of anechoic reliefs and/or patterns between the first and second mounting zones.

11. The acoustic device according to claim 1, wherein the acoustic device has an assembly collar at each of its ends.

* * * * *